United States Patent [19]

Geary

[11] Patent Number: 6,006,518

[45] Date of Patent: Dec. 28, 1999

[54] OCEAN CURRENT ENERGY CONVERTER

[76] Inventor: Jeffrey B. Geary, 50 E. Green St. #605, Pasadena, Calif. 91105

[21] Appl. No.: 09/001,930

[22] Filed: Dec. 31, 1997

Related U.S. Application Data

[60] Provisional application No. 60/034,037, Dec. 30, 1996.

[51] Int. Cl.[6] .................................................. F16D 31/62
[52] U.S. Cl. ................................. 60/398; 290/42; 290/53
[58] Field of Search ............................... 60/398; 290/42, 290/53; 415/3.1, 541

[56] References Cited

U.S. PATENT DOCUMENTS

| | | | |
|---|---|---|---|
| 408,075 | 7/1889 | Brown | 415/3.1 X |
| 3,692,427 | 9/1972 | Risse | 415/141 X |
| 4,224,793 | 9/1980 | Gutsfeld | 60/398 |
| 4,345,433 | 8/1982 | Stanwick | 60/398 X |
| 5,051,059 | 9/1991 | Rademacher | 415/3.1 X |
| 5,755,553 | 5/1998 | Laemthongsawad | 415/3.1 |

FOREIGN PATENT DOCUMENTS

| | | | |
|---|---|---|---|
| 1452483 | 10/1976 | United Kingdom | 415/3.1 |

*Primary Examiner*—Hoang Nguyen
*Attorney, Agent, or Firm*—Goldstein & Canino

[57] ABSTRACT

An ocean current energy converter is disclosed which, by positioning upon an ocean floor, harnesses and converts energy stemming from wave, tide, and current propagation into useful electrical power. The ocean current energy converter comprises a pair of support legs which are secured to a rotating canister which comprises a plurality of fins disposed about an outer periphery of said rotating canister. Wave motion acting upon the fins of the rotating canister causes said canister to rotate, thus driving a power generating source contained therein, and producing electrical energy.

2 Claims, 4 Drawing Sheets

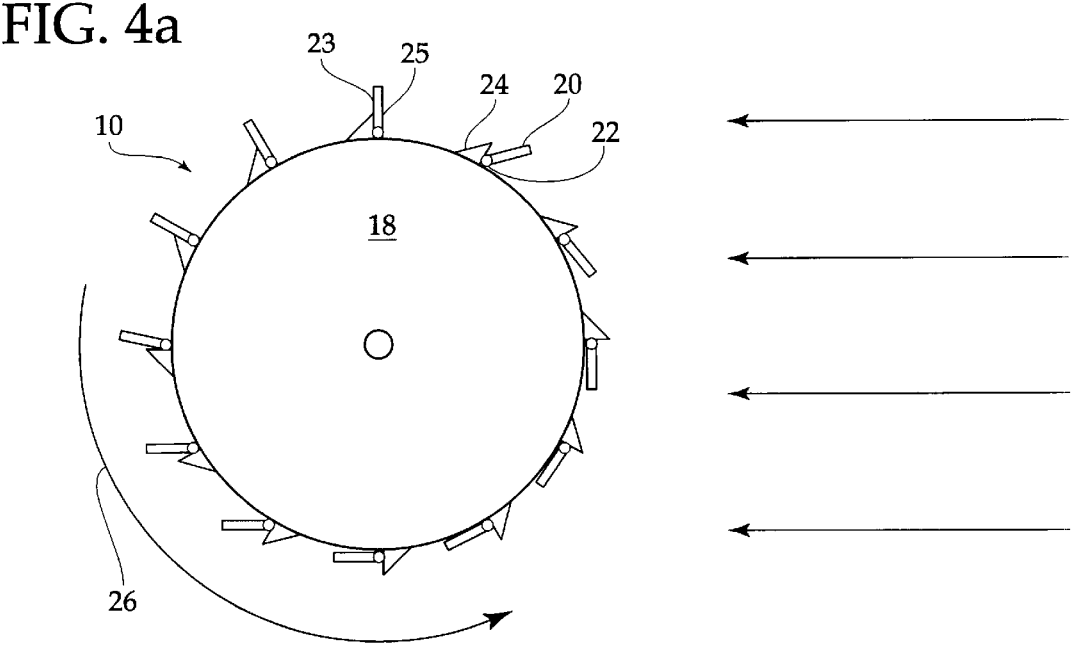
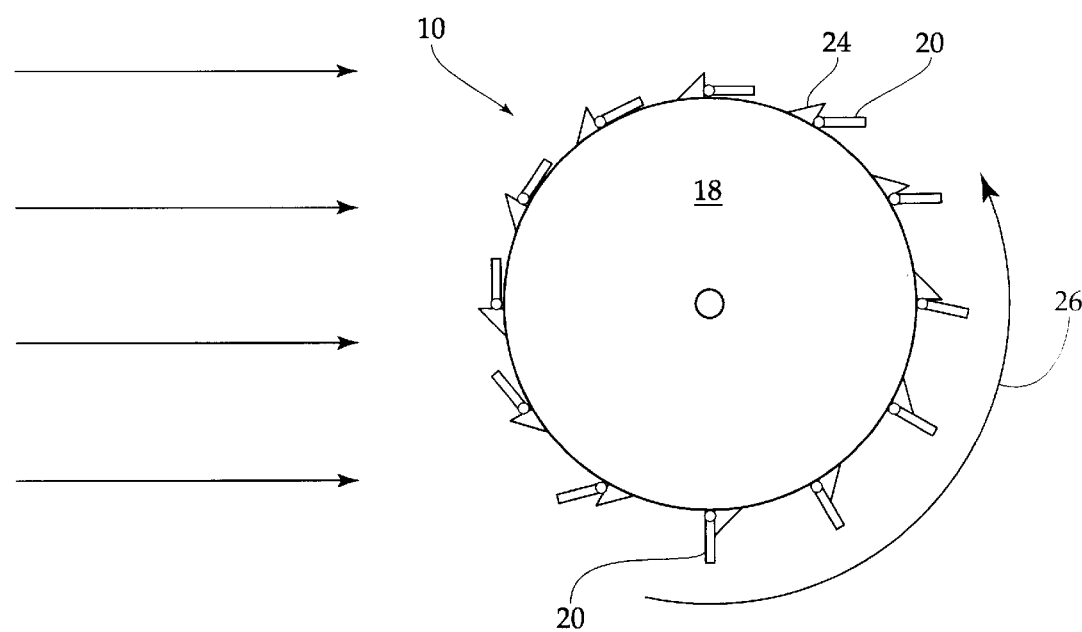

OCEAN CURRENT ENERGY CONVERTER

This patent application relates to subject matter in Provisional Patent Application #60/034,037 filed Dec. 30, 1996.

BACKGROUND OF THE INVENTION

The invention relates to an ocean current energy converter. More particularly, the invention relates to an ocean current energy converter apparatus which harnesses and utilizes the changing hydrodynamics of an ocean current or wave motion.

It has been well known for some time that aquatic environments such as lakes, rivers, streams and such possess valuable energy potentials. Typically, energy is harnessed from rivers and similar narrow current-flowing waterways by installing a hydraulically driven turbine, connected to a power generating source, at a particular location. The number of suitable locations at which such installation is possible is of course limited, as the number of heavy flowing rivers and similar narrow waterways are also limited. In addition, the installation of these types of applications also generally requires that the turbines be installed at or near the surface of the body of water, thus again limiting the number of potential locations at which such installation may take place. A device is needed which can harness the large, untapped reservoir of energy found in ocean currents, thus providing a vast number of possible site-locations for installation of such a device.

In addition to the requirement that these traditional application be installed at stringent, site-specific locations which are limited in number, another problem is inherent in their use. These devices must usually be permanently installed at a particular location, incapable of being moved or adjusted in response to ecological changes around them. Indeed, water levels and currents vary greatly upon rivers and narrow current-flowing waterways, sometimes necessitating that the hydro-electric devices installed thereat be adjusted or relocated. No devices currently exist which are capable of being removed from a particular location or adjusted thereat.

Furthermore, these traditional devices fail to allow for modular system installations. In other words, only a fixed number of apparatus are usually capable of being installed at a particular location. If a greater power output is desired from a specific site location, it is usually not possible for further hydro-electric apparatus to be installed thereat with any ease. There does not exist presently any hydro-electric apparatus which are capable of being installed in a variable number, such that particular units may be added to or removed from the site system as required (i.e. in response to increases or decreases in system usage requirements).

While these traditional units discussed above may be suitable for the particular purpose employed, or for general use, they would not be as suitable for the purposes of the present invention as disclosed hereafter.

SUMMARY OF THE INVENTION

It is an object of the invention to produce an ocean current energy converter.

It is another object of the invention to produce an ocean current energy converter apparatus which harnesses and utilizes the changing hydrodynamics of an ocean current or wave motion.

It is a further object of the invention to produce an ocean current energy converter which can harness the large, untapped reservoir of energy found in ocean currents by allowing said device to be installed below the surface and upon the ocean floor, thus providing a vast number of possible site-locations for installation of such a device.

It is a still further object of the invention to produce an ocean current energy converter which is capable of being easily removed from a particular location or adjusted thereat.

It is yet another object of the invention to produce an ocean current energy converter which is capable of modular installation, such that particular units may be added to or removed from the site system as required.

The invention is an ocean current energy converter which, by positioning upon an ocean floor, harnesses and converts energy stemming from wave, tide, and current propagation into useful electrical power. The ocean current energy converter comprises a pair of support legs which are secured to a rotating canister which comprises a plurality of fins disposed about an outer periphery of said rotating canister. Wave motion acting upon the fins of the rotating canister causes said canister to rotate, thus driving a power generating source contained therein, and producing electrical energy.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIGS. 4a and 4b are side views of the ocean current energy converter, depicting how hinged fins disposed about the periphery of a rotating canister of said converter permit efficient uni-directional rotation of said rotating canister.

DETAILED DESCRIPTION OF THE PREFERRED EMBODIMENTS

Figure 1:
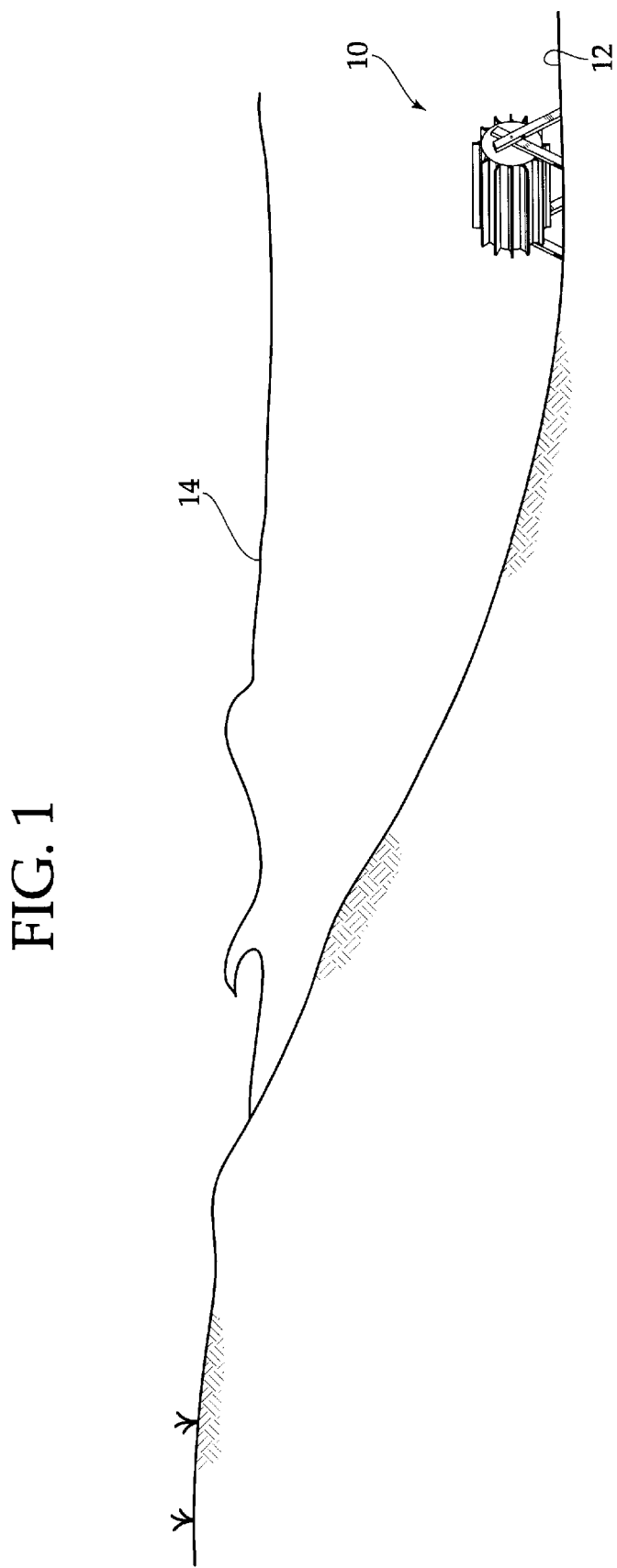
FIG. 1 is a pictorial representation of an ocean current energy converter installed upon an ocean floor.

FIG. 1 illustrates an ocean current energy converter 10 installed upon an ocean floor 12. By positioning said ocean current energy converter 10 below the surface 14 of the ocean or similar body of water, energy stemming from wave, tide, and current propagation can be harnessed and converted into useful electrical power. The construction and operation of the ocean current energy converter 10 is best described with reference to FIGS. 2 through 4b.

Figure 2:
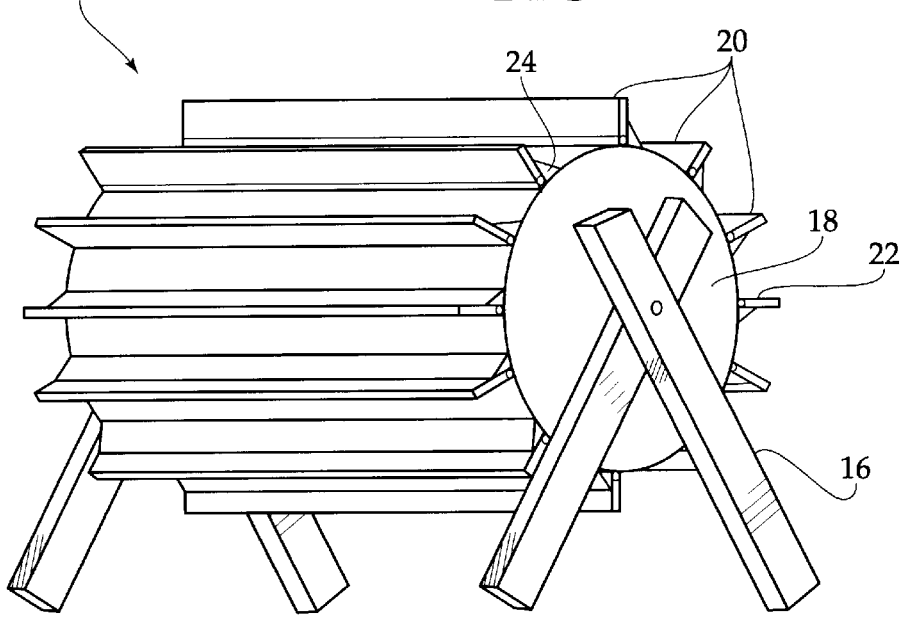
FIG. 2 is a diagrammatic perspective view of the ocean current energy converter.

FIG. 2 is a diagrammatic perspective view of the ocean current energy converter 10. As seen, the ocean current energy converter 10 comprises a pair of support legs 16, which are secured to a rotating canister 18. The rotating canister 18 comprises a plurality of fins 20 which are disposed about the outer periphery of said rotating canister 18. The fins 20 are pivotally secured to the outer periphery of the rotating canister 18 by pivoting means 22 such as a hinge or pin. A brace 24 is affixed to one side of each fin 20 thus defining a braced end 23 and unbraced end 25 of each fin 20, such that said fins 20 are permitted to collapse flat in one direction but not in the other, opposite direction. All braces 24 are affixed on the equivalent side of the fins 20, as seen in FIGS. 4a and 4b. Accordingly, the rotating canister 18 operates uni-directionally, regardless of the direction of the wave, tide or current force upon the rotating canister 18.

As seen in FIG. 4a, a force upon the rotating canister 18 from the right will lift the fins 20 located at the top of said rotating canister 18. These fins 20 located at the top will be precluded from collapsing flat upon the surface of the rotating canister 18, since the brace 24 located therebehind will not allow said fin 20 to travel beyond an angle of approximately 90 degrees with the tangent of the rotating canister 18. Accordingly, the force upon these top, destended fins 20 will cause the rotating canister 18 to turn in a counter-clockwise direction, as indicated by arrow 26. The fins 20 located at the bottom of the rotating canister 18 collapse flat in response to the force upon them, thus reducing drag on the bottom, prohibiting said bottom fins 20 from counter-acting the movement force upon the top fins 20, and thus permitting the rotating canister 18 to rotate in the indicated direction.

In the event that the wave, tide or current force upon the rotating canister 18 is acting upon said rotating canister 18 from the opposite, left side (as a result, for instance, of changing tides or currents), the canister 18 will still only be permitted to rotate in a counter-clockwise direction, as indicated by arrow 26 of FIG. 4b. The force from the left will lift the fins 20 located at the bottom of the rotating canister 18. These fins 20 will be precluded from collapsing flat upon the surface of the rotating canister 18, since the braces 24 located therebehind will not allow these fins 20 to travel beyond an angle of approximately 90 degrees with the tangent of the rotating canister 18. Accordingly, the force upon these bottom, destended fins 20 will cause the rotating canister 18 to turn in the counter-clockwise direction indicated by arrow 26. The fins 20 located at the top of the rotating canister 18 collapse flat in response to the force upon them, thus reducing drag on the top and prohibiting said bottom fins 20 from counter-acting the rotational movement force upon the bottom fins 20.

Figure 3:
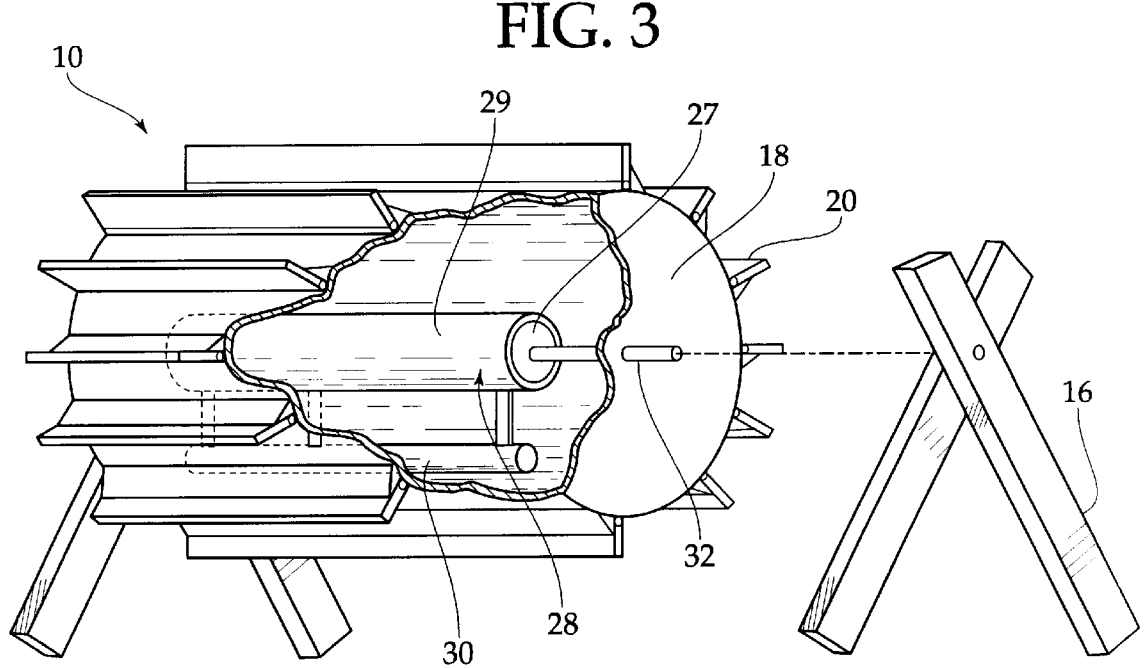
FIG. 3 is an exploded diagrammatic perspective view of the ocean current energy converter, with parts broken away to illustrate the electrical generator-counterweight assembly contained therein.
Figure 5:
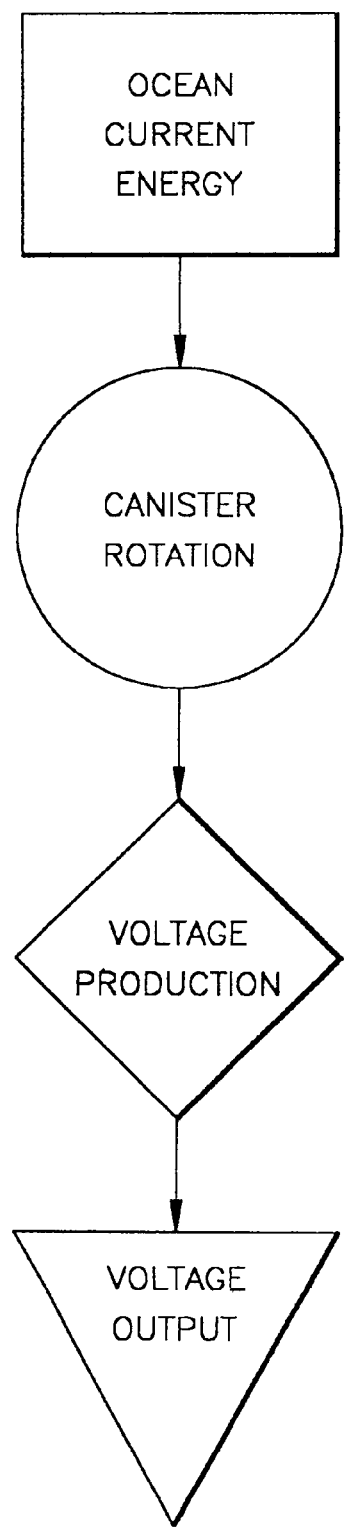
FIG. 5 is a diagram showing steps of converting ocean current energy to electrical energy using the present invention.

FIG. 3 illustrates a power generator 28 comprising an internal magneto 27 which is rotateably contained within an outer body 29. An armature 32 is affixed to and rotates along with the rotating canister 18 and drives the internal magneto 27 of the generator 28. A counter-weight 30 is suspended from said outer body 29, thus preventing the outer body 29 from rotating along with the rotating canister 18.

What is claimed is:

1. An ocean current energy converter for harnessing energy stemming from wave, current or tidal propagation in oceans, lakes, rivers and similar bodies of water, comprising:

a) a rotating canister;
   b) a power generator contained within the rotating canister;
   c) a pair of support legs, upon which said rotating canister is rotateably mounted;
   d) a plurality of fins disposed about the outer periphery of the rotating canister, said fins pivotally secured to said rotating canister;
   e) a brace affixed to one side of each fin, each brace affixed to an equivalent side of each fin so that no braces may be adjacent, and defining a braced end and unbraced end of each fin, such that all fins are permitted to collapse flat in one similar direction towards the unbraced end, whereby a force acting against the unbraced end of the fins will cause said fins to extend perpendicular to the tangent of the rotating canister and thus cause rotation of said rotating canister, and the force acting upon the opposite end of the rotating canister would necessarily be acting upon the braced end of each fin, and thus force those fins flat, thus reducing drag and prohibiting them from counter-acting the movement force of the opposite upright fins.

2. The ocean current energy converter of claim one, wherein the power generator contained within the rotating canister consists of an internal magneto which is rotateably contained within an outer body, an armature which is secured to the rotateable canister and rotates the internal magneto in response to rotation of said canister, and a counter weight suspended from the outer body for preventing the outer body from rotating along with the rotating canister.

* * * * *